(12) United States Patent
Kameoka

(10) Patent No.: US 11,900,957 B2
(45) Date of Patent: Feb. 13, 2024

(54) VOICE CONVERSION LEARNING DEVICE, VOICE CONVERSION DEVICE, METHOD, AND PROGRAM

(71) Applicant: NIPPON TELEGRAPH AND TELEPHONE CORPORATION, Tokyo (JP)

(72) Inventor: Hirokazu Kameoka, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 443 days.

(21) Appl. No.: 17/251,711

(22) PCT Filed: Jun. 13, 2019

(86) PCT No.: PCT/JP2019/023528
§ 371 (c)(1),
(2) Date: Dec. 11, 2020

(87) PCT Pub. No.: WO2019/240228
PCT Pub. Date: Dec. 19, 2019

(65) Prior Publication Data
US 2021/0118460 A1    Apr. 22, 2021

(30) Foreign Application Priority Data
Jun. 14, 2018  (JP) .................. 2018-113932

(51) Int. Cl.
*G10L 21/007*  (2013.01)
*G06N 3/08*    (2023.01)
*G10L 19/008*  (2013.01)

(52) U.S. Cl.
CPC ............. *G10L 21/007* (2013.01); *G06N 3/08* (2013.01); *G10L 19/008* (2013.01)

(58) Field of Classification Search
CPC ........ G10L 21/007; G10L 19/008; G06N 3/08
See application file for complete search history.

(56) References Cited

PUBLICATIONS

Chou, Multi-target Voice Conversion without Parallel Data by Adversarially Learning Disentangled Audio Representations, 2018, arXiv, whole document (Year: 2018).*

(Continued)

*Primary Examiner* — Sonia L Gay

(57) ABSTRACT

To be able to convert to a voice of the desired attribution. The present invention includes learning, on the basis of parallel data of a sound feature value series in a conversion-source voice signal and a latent variable series in the conversion-source voice signal, and an attribution code indicating attribution of the conversion-source voice signal, an encoder for estimating a latent variable series from input of a sound feature value series and an attribution code, and a decoder for reconfiguring the sound feature value series from input of the latent variable series and the attribution code, to maximize a value of an objective function, the objective function being represented using attribution code similarity of a sound feature value series reconfigured by the decoder from input of an error between the sound feature value series reconfigured by the decoder and the sound feature value series in the conversion-source voice signal in the parallel data, a distance between the latent variable series estimated by the encoder and the latent variable series in the conversion-source voice signal in the parallel data, and any attribution code, the attribution code similarity being similarity to the any attribution code identified by an attribution identifier.

20 Claims, 9 Drawing Sheets

(56) References Cited

PUBLICATIONS

Akuzawa, Expressive Speech Synthesis via Modeling Expressions with Variational Autoencoder, 2018, arXiv, whole document (Year: 2018).*

Hsu et al. (2016) "Voice Conversion from Non-parallel Corpora Using Variational Auto-encoder" Proc.APSIPA, pp. 1-6.

Hsu et al. (2017) "Voice Conversion from Unaligned Corpora using Variational Auto encoding Wasserstein Generative Adversarial Networks" pp. 3364-3368. 10.21437/Interspeech.2017-63.

* cited by examiner

ND DEVICE, METHOD,
VOICE CONVERSION LEARNING DEVICE, VOICE CONVERSION DEVICE, METHOD, AND PROGRAM

CROSS-REFERENCE TO RELATED APPLICATIONS

This application is a U.S. 371 Application of International Patent Application No. PCT/JP2019/023528, filed on 13 Jun. 2019, which application claims priority to and the benefit of JP Application No. 2018-113932, filed on 14 Jun. 2018, the disclosures of which are hereby incorporated herein by reference in their entireties.

TECHNICAL FIELD

The present invention relates to a voice conversion learning system, voice conversion system, method, and program, and more particularly, to a voice conversion learning system, voice conversion system, method, and program for converting a voice.

BACKGROUND ART

The voice conversion is a technology for converting only a non-language/paralanguage (such as speaker individuality and utterance style) while keeping the language information (utterance sentences) in the input voice. The voice conversion can be applied to speaker individuality conversion, speech support, speech enhancement, and pronunciation conversion or the like in text speech synthesis. The problem in the voice conversion can be formulated as a problem in regression analysis in estimating the mapping function from the sound feature value of the conversion-source voice to the sound feature value of the conversion-target voice. Among conventional voice conversion methods, a technique using the Gaussian Mixture Model (GMM) is commonly used because of its validity and versatility. Recent studies also evaluate neural network based techniques such as the Feed-Forward Neural Network (NN), the Recurrent NN (RNN), and the Convolutional NN (CNN), and exemplar based techniques using the Non-negative Matrix Factorization (NMF) or the like.

Most of these techniques learn the conversion function so that the sound feature value of the converted voice approaches the sound feature value of the target voice as much as possible using parallel data that includes a time aligned voice pair of the same utterance content. However, in some applications, it is often difficult to provide pair data of a conversion-source voice and a target voice of the same utterance content. In addition, even if the pair data can be provided, time alignment may be required at high accuracy, and automatic time alignment may need visual and manual pre-screening to correct misalignment.

Meanwhile, a non-parallel voice conversion method has also been proposed that does not necessarily need parallel data. An example is a method using voice recognition. This method constructs the parallel data by pairing the sound feature values in a time frame recognized as the same phoneme in the conversion-source voice and the conversion-target voice. Because parallel data is constructed, it is assumed that the voice recognition can be performed on the object voice at high accuracy. But, if the voice recognition has a poor accuracy, it has limited performance. Methods specific to the task of converting the speaker individuality include a speaker adaptation technology. This method does not need the parallel data of the conversion-source voice and the conversion-target voice, but it may need to use parallel data of a reference voice to learn the speaker space. It has recently been proposed to use a non-parallel voice conversion based on the Conditional Variational Autoencoder (CVAE) as a method that does not need data such as a text label and reference voice, a module such as voice recognition, or parallel data at all (NPL 1 and NPL 2). The purpose of this method is to learn an encoder NN that outputs, from input of a sound feature value x and an attribution code c corresponding to its attribution, parameters of a conditional distribution of a latent variable z $$q(z|x, c)$$

and a decoder NN that outputs, from input of the latent variable z and the attribution code c, parameters of a conditional distribution of the sound feature value x $$p(x|z, c)$$

using a learning sample $$\{x_m, c_m\}_{m=1}^{M}.$$

By providing the thus learned encoder and decoder with the sound feature value x and a target attribution code c' of the conversion-source voice, a sound feature value ^x of the attribution c' may be generated while keeping the utterance content of the conversion-source voice.

CITATION LIST

Non Patent Literature

[NPL 1] C. C. Hsu, H. T. Hwang, Y. C. Wu, Y. Tsao, and H. M. Wang, "Voice conversion from non-parallel corpora using variational auto-encoder", in Proc. APSIPA, 2016, pp. 1-6.

[NPL 2] C. C. Hsu, H. T. Hwang, Y. C. Wu, Y. Tsao, and H. M. Wang, "Voice conversion from unaligned corpora using variational autoencoding Wasserstein generative adversarial networks", in Proc. Interspeech, 2017, pp. 3364-3368.

SUMMARY OF THE INVENTION

Technical Problem

As described above, this scheme has an advantage that parallel data is not necessary, while the feature value of the generated voice tends to be excessively smoothed, which contributes to the limited quality of the converted voice. This is because, as the conditional distribution of the decoder, a parametric probability distribution such as the gauss distribution is assumed and the assumed distribution does not coincide the true probability distribution that the sound feature value actually follows. In addition, in the above CVAE scheme, it is possible to learn, with the encoder and decoder receiving the attribution code c as an auxiliary input, the conditional distribution of the latent variable series $$q(z|x, c)$$

and the conditional distribution of the sound feature value series $$p(x|z, c)$$

However, depending on the complexity and expressiveness of the encoder and decoder as a function, the following may be learned to be independent of the attribution code c.

$$q(z|x, c), p(x|z, c)$$

The conventional learning criterion has not been designed to avoid such a situation. For example, it may be easy to understand the case where the conversion process of the input x by the encoder and decoder is the identity mapping. Then, the model may be expressed without depending on any input x or auxiliary input c, so that $$q(z|x, c), p(x|z, c)$$

do not depend on the attribution code c as follows.

$$q(z|x, c)=q(z|x)$$

$$p(x|z, c)=p(x|z)$$

Even when the thus learned model is input with the sound feature series with c set as the target attribution, the input value is directly output from the decoder without receiving any effect of c, which provides no conversion effect.

As described above, the above CVAE scheme has an advantage that it is in a framework of a non-parallel voice conversion, but it still has problems to be solved concerning the converted voice quality and the conversion effect.

The present invention is provided to solve the above problems and the purpose thereof is to provide a voice conversion learning system, method, and program that may learn a conversion function that may convert to a voice of the desired attribution.

Another purpose of the present invention is to provide a voice conversion system, method, and program that may convert to a voice of the desired attribution.

Means for Solving the Problem

To achieve the above purpose, a voice conversion learning system according to the present invention is configured by including a learning unit, the learning unit learning an encoder for, on the basis of parallel data of a sound feature value series in a conversion-source voice signal and a latent variable series in the conversion-source voice signal, and an attribution code indicating attribution of the conversion-source voice signal, estimating a latent variable series from input of a sound feature value series and an attribution code, and a decoder for reconfiguring the sound feature value series from input of the latent variable series and the attribution code, and the learning unit learning the encoder and decoder to maximize a value of an objective function, the objective function being represented using attribution code similarity of a sound feature value series reconfigured by the decoder from input of an error between the sound feature value series reconfigured by the decoder and the sound feature value series in the conversion-source voice signal in the parallel data, a distance between the latent variable series estimated by the encoder and the latent variable series in the conversion-source voice signal in the parallel data, and any attribution code, the attribution code similarity being similarity to the any attribution code identified by an attribution identifier.

In addition, a voice conversion learning method according to the present invention includes learning, by a learning unit, an encoder for, on the basis of parallel data of a sound feature value series in a conversion-source voice signal and a latent variable series in the conversion-source voice signal, and an attribution code indicating attribution of the conversion-source voice signal, estimating a latent variable series from input of a sound feature value series and an attribution code, and a decoder for reconfiguring the sound feature value series from input of the latent variable series and the attribution code, and learning the encoder and decoder to maximize a value of an objective function, the objective function being represented using attribution code similarity of a sound feature value series reconfigured by the decoder from input of an error between the sound feature value series reconfigured by the decoder and the sound feature value series in the conversion-source voice signal in the parallel data, a distance between the latent variable series estimated by the encoder and the latent variable series in the conversion-source voice signal in the parallel data, and any attribution code, the attribution code similarity being similarity to the any attribution code identified by an attribution identifier.

In addition, a voice conversion system according to the present invention includes: an encoder calculation unit for estimating a latent variable series from input sound feature value series in a conversion-source voice signal and an attribution code indicating attribution of the conversion-source voice signal, by using an encoder for estimating a latent variable series from input of a sound feature value series and an attribution code; and a decoder calculation unit for estimating a sound feature value series of a target voice signal from the estimated latent variable series and the input attribution code indicating attribution of the target voice signal by using a decoder for reconfiguring the sound feature value series from input of the latent variable series and the attribution code, the encoder and decoder being previously learned to maximize a value of an objective function, on the basis of parallel data of a sound feature value series in a conversion-source voice signal and a latent variable series in the conversion-source voice signal, and an attribution code indicating attribution of the conversion-source voice signal, the objective function being represented using attribution code similarity of a sound feature value series reconfigured by the decoder from input of an error between the sound feature value series reconfigured by the decoder and the sound feature value series in the conversion-source voice signal in the parallel data, a distance between the latent variable series estimated by the encoder and the latent variable series in the conversion-source voice signal in the parallel data, and any attribution code, the attribution code similarity being similarity to the any attribution code identified by an attribution identifier.

In addition, a voice conversion method according to the present invention includes: learning, by an encoder calculation unit, estimating a latent variable series from input sound feature value series in a conversion-source voice signal and an attribution code indicating attribution of the conversion-source voice signal, by using an encoder for estimating a latent variable series from input of a sound feature value series and an attribution code; and estimating, by a decoder calculation unit, a sound feature value series of a target voice signal from the estimated latent variable series and the input attribution code indicating attribution of the target voice signal by using a decoder for reconfiguring the sound feature value series from input of the latent variable series and the attribution code, the encoder and decoder being previously learned to maximize a value of an objective function, on the basis of parallel data of a sound feature value series in a conversion-source voice signal and a latent variable series in the conversion-source voice signal, and an attribution code indicating attribution of the conversion-source voice signal, the objective function being represented using attribution code similarity of a sound feature value series reconfigured by the decoder from input of an error between the sound feature value series reconfigured by the decoder and the sound feature value series in the conversion-source voice signal in the parallel data, a distance between the latent variable series estimated by the encoder and the latent variable series in the conversion-source voice signal in the parallel data, and any attribution code, the attribution code similarity being similarity to the any attribution code identified by an attribution identifier.

In addition, a program according to the present invention is a program for allowing a computer to function as each part in the voice conversion learning system according to the above invention or each part in the voice conversion system according to the above invention.

Effects of the Invention

A voice conversion learning system, a method, and a program of the present invention may provide an effect that may learn a conversion function that may convert to a voice of a desired attribution, by learning an encoder for estimating a latent variable series from input of a sound feature value series and an attribution code, and a decoder for reconfiguring the sound feature value series from input of the latent variable series and the attribution code, to maximize a value of an objective function, the objective function being represented using attribution code similarity of a sound feature value series reconfigured by the decoder from input of an error between the sound feature value series reconfigured by the decoder and the sound feature value series in the conversion-source voice signal in the parallel data, a distance between the latent variable series estimated by the encoder and the latent variable series in the conversion-source voice signal in the parallel data, and any attribution code, the attribution code similarity being similarity to the any attribution code identified by an attribution identifier.

A voice conversion system, a method, and a program of the present invention may convert to a voice of a desired attribution by using an encoder and a decoder that are previously learned to maximize a value of an objective function, the objective function being represented using attribution code similarity of a sound feature value series reconfigured by the decoder from input of an error between the sound feature value series reconfigured by the decoder and the sound feature value series in the conversion-source voice signal in the parallel data, a distance between the latent variable series estimated by the encoder and the latent variable series in the conversion-source voice signal in the parallel data, and any attribution code, the attribution code similarity being similarity to the any attribution code identified by an attribution identifier, in order to estimate, by an encoder, a latent variable series from a sound feature value series in an input conversion-source voice signal and an attribution code indicating attribution of the conversion-source voice signal and estimating, by a decoder, a sound feature value series of a target voice signal from the estimated latent variable series and an attribution code indicating attribution of an input target voice signal.

DESCRIPTION OF EMBODIMENTS

Figure 1:
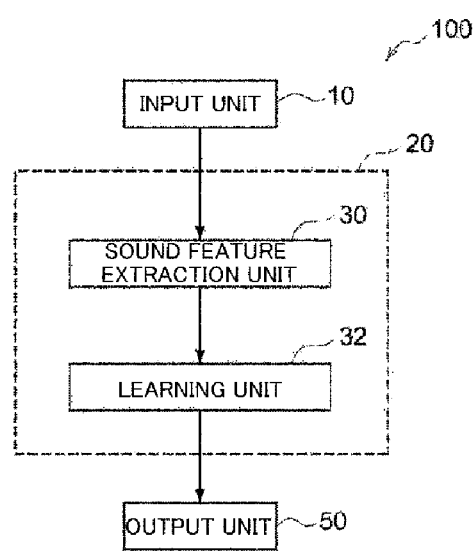
FIG. 1 is a block diagram showing a configuration of a voice conversion learning system according to an embodiment of the present invention.

Embodiments of the present invention will be described in more detail below with reference to the drawings.

<Overview according to Embodiments of the Present Invention>

An overview according to the embodiments of the present invention will first be described.

The embodiment of the present invention proposes a non-parallel voice conversion technique that may overcome the above problems and limitation of the conventional technology. Advantages of the method according to the embodiments of the present invention include: (1) that data such as a text label and reference voice or a module such as a voice recognition are not additionally needed; (2) that excessive smoothing of audio parameter, which is often a problem in many conventional voice conversion methods, is less likely to occur; (3) that conversion is possible that reflects time dependence of the voice of the conversion source and target; (4) that the learning criterion includes a degree of the target attribution in the converted voice measured by an attribution identifier; and (5) that a single encoder and decoder may allow for conversion to multiple attributions (the number of parameters to be learned remains almost unchanged for the number of attributions).

The above advantages of the method according to the embodiments of the present invention may be achieved by the following (a) to (e).

(a) An attribution identifier is used along with an encoder and a decoder.

(b) A sound feature value series is used as input of the encoder, output of the decoder, and input of the attribution identifier, and a latent variable series is used as output of the encoder and input of the decoder.

(c) Networks of the encoder, decoder, and attribution identifier are modeled by the CNN (such as the gated CNN) or the RNN (such as the LSTM).

(d) The attribution identifier is learned along with the encoder and decoder using a learning criterion including an input value reconstruction error criterion, a latent variable distribution distance criterion, and an attribution identification criterion.

(e) A spectrum gain function with attribution conversion is calculated on the basis of a variation between a sound feature value series converted from the sound feature value series of the input voice by the learned encoder and decoder to provide the target attribution and a sound feature value series converted from the sound feature value series of the input voice to provide the same attribution as the input voice, and then the spectrum gain function is multiplied to the spectrum series of the input voice is multiplied to calculate the time domain signal, thus providing the converted voice.

<Principle of Embodiments of the Present Invention>
<Variational Autoencoder (VAE)>

The VAE is a probabilistic generative model of a Neural Network (NN) of an encoder and a decoder. The encoder network is an NN that outputs, for given input data x, probability distribution parameters (an average and a dispersion for the gauss distribution) of a conditional distribution $q(z|x)$ of a latent variable z. The decoder network is an NN that outputs, for a given latent variable z, a probability distribution parameter of a conditional distribution of data x.

$p(x|z)$

In learning of VAE, learning data $X=\{x_n\}_{n=1}^N$ is used and the purpose is to determine NN parameters $\varphi$ and $\theta$ so that an encoder distribution $q(z|x)$ coincides with a posterior distribution $p(z|x) \propto p(x|z)p(z)$ as much as possible.

The Jensen's inequality may be used to provide the lower bound of log marginal likelihood (evidence) log p(x).

[Formula 1]

$$\begin{aligned} \log p(x) &= \log \int p(x,z)dz \\ &= \log \int q(z|x)\frac{p(x|z)p(z)}{q(z|x)} \geq \\ &\int q(z|x)\log\frac{p(x|z)p(z)}{q(z|x)} \\ &= \mathbb{E}_{z\sim q(z|x)}[\log p(x|z)] - KL[q(z|x)\|p(z)] \end{aligned} \quad (1)$$

The difference between the left and right sides of formula (1) equals the Kullback-Leibler (KL) divergence $KL[q(z|x)\|p(z|x)]$ of $q(z|x)$ and $p(z|x)$ and is minimized at

[Formula 2]

$q(z|x)=p(z|x)$

Therefore, increasing the right side of formula (1) corresponds to approximation of $q(z|x)$ and $p(z|x) \propto p(x|z)p(z)$ Here, the following is output of the encoder network of parameter $\varphi$.

$\mu_\varphi(x), \log\sigma_{99}^2(x)$

The following is output of the decoder network of parameter $\theta$.

$\mu_\theta(z), \log\sigma_{74}^2(z)$

The following distributions $q(z|x), p(x|z)$ are normal distributions with the parameters $\varphi$ and $\theta$ as the average and dispersion.

$q_{99}(z|x), p_\theta(x|z)$

In addition, if it is assumed that $p(z)$ is a standard normal distribution

[Formula 3]

$$q_{99}(z|x) = \mathcal{N}(z|\mu_\varphi(x), \mathrm{diag}(\sigma_{99}^2(x))) \quad (3)$$

[Formula 4]

$$p_{74}(x|z) = \mathcal{N}(x|\mu_\theta(z), \mathrm{diag}(\sigma_{74}^2(z))) \quad (4)$$

[Formula 5]

$$p(z) = \mathcal{N}(z|0, I) \quad (5)$$

then, the first term on the right side of formula (1) is rewritten as

[Formula 6]

$$\mathbb{E}_{z\sim q_\theta(z|x)}[\log p_\theta(x|z)] = \mathbb{E}_{z\sim \mathcal{N}(\epsilon|0,I)}\left[-\frac{1}{2}\sum_i \log 2\pi[\sigma_\theta^2(\mu_\varphi(x) + \sigma_\varphi(x)\odot\epsilon)]_i - \sum_i \frac{(x_i - [\mu_\theta(\mu_\varphi(x) + \sigma_\varphi(x)\odot\epsilon)]_i)^2}{2[\mu_\theta^2(\mu_\varphi(x) + \sigma_\varphi(x)\odot\epsilon)]_i}\right] \quad (6)$$

Here, the fact is used that the following $z\sim q_\varphi(z|x)$ can be variable-converted to $\epsilon \sim \mathcal{N}(\epsilon|0, I)$ through the relational expression of $z = \mu_\varphi(x) + \sigma_\varphi(x)\odot\epsilon$ Note, however, that the following represents a product for each element.

$\odot$

It is seen that formula (6) is the negative of a weighted square error of x and $\mu_\theta(\mu_{99}(x))$ if the random term derived from $\epsilon$ is ignored. In addition, the second term on the right side of formula (1) is given as the negative of the KL divergence of $q_{99}(z|x)$ and $p(z) = \mathcal{N}(z|0, I)$ and works as a regularization term that forces each element in output of the encoder network to follow the normal distribution independently. Subsequently, the first term of the right side of formula (1) is referred to as an input value reconstruction error criterion, the second term as a latent variable distribution distance criterion.

A conditional VAE (CVAE) is an extended version of the VAE in which the encoder and decoder can receive an auxiliary variable c, as follows.

[Formula 7]

$$q_{99}(z|x, c) = \mathcal{N}(z|\mu_\phi(x, c), \text{diag}(\sigma_{99}^2(x, c))) \quad (7)$$

[Formula 8]

$$p_\theta(x | z, c) = \mathcal{N}(x | \mu_\theta(z, c), \text{diag}(\sigma_\theta^2(z, c))) \quad (8)$$

The objective function to be maximized is

[Formula 9]

$$\mathcal{J}(\phi, \theta) = \quad (9)$$

$$\mathbb{E}_{c \sim p(c), x \sim p_\theta(x|c)}[\mathbb{E}_{z \sim q_\phi(z|x,c)}[\log p_\theta(x | z, c)] - KL[q_\phi(z | x, c)][p(z)]].$$

Note, however, that the following term means a sample average over data samples of all attribution.

$$\mathbb{E}_{c \sim p(c), x \sim p(x|c)}[19]$$

In other words, formula (9) has the same meaning as

[Formula 10]

$$\mathcal{J}(\phi, \theta) = \quad (10)$$

$$\frac{1}{N}\sum_{n=1}^{N}\left(\mathbb{E}_{z \sim q_\phi(z|x_n, c_n)}[\log p_\theta(x_n | z, c_n)] - KL[q_\phi(z | x_n, c_n)\|p(z)]\right).$$

<Voice Conversion by CVAE (Conventional Method)>
For $$x \in \mathbb{R}^D$$

as a sound feature value (such as the mel-cepstrum coefficient), and c as an attribution code, the problem of non-parallel voice conversion can be formulated with the CVAE (NPL 1 and NPL 2). For $$\{x_n, c_n\}_{n=1}^N$$

as learning data, the encoder learns a function that converts the sound feature value $x_n$ to the latent variable $z_n$ according to the attribution code $c_n$ and the decoder learns a function that reconfigures the sound feature value $\hat{x}_n$ from the latent variable $z_n$ according to the attribution code $c_n$. After the learning is completed, the sound feature value in each frame of the conversion-source voice may be input to the encoder, and the generated latent variable as well as the target attribution code may be input to the decoder to reconfigure the sound feature value, thus providing a sound feature value series with the target attribution. Then the resulting sound feature value series needs only to be converted to the time domain signal.

<Voice Conversion by Time Series CVAE (Conventional Method)>

A voice has different ways of speaking and voice changing depending on the context and utterance content. Therefore, it is preferable that a function for converting the sound feature value has time dependence (i.e., the function is determined depending on the historical record of the sound feature value series of the input and output voices). However, as the above method converts the sound feature value independently for each frame, the method is not a conversion method that reflects the time-dependent relationship of the sound feature value series. Then, the method is extended to the input and output of the CVAE to a form assuming time-series data so that a conversion may be possible that reflects the time dependence of the sound feature value of the voice. Specifically, the networks of the encoder and decoder are modeled by the CNN (such as the CNN) or the RNN (such as the LSTM). Here, the sound feature value series of an utterance m is given as $$x_m \in \mathbb{R}^{Q \times N_m}$$

and the attribution code as $c_m$. Learning data is given as $$\{X_m, c_m\}_{m=1}^M$$

The encoder learns a function that converts the sound feature value series $x_m$ to the latent variable series $$z_m \in \mathbb{R}^{Q'_m \times N'_m}$$

according to the attribution code $c_m$, and the decoder learns a function that reconfigures the sound feature value series $\hat{x}_m$ from the latent variable series $z_m$ according to the attribution code $c_m$. After the learning is completed, the sound feature value series of the utterance of the conversion-source attribution may be input to the encoder, and the generated latent variable series as well as the target attribution code may be input to the decoder to reconfigure the sound feature value series, thus providing a sound feature value series with the target attribution. Then the resulting sound feature value series needs only to be converted to the time domain signal. As the network structures of the encoder and decoder, the CNN and RNN or the like may be used, for example. For the CNN, $x_m$ may be regarded as an image of 1 channel with a size of $Q \times N_m$ so that 2 dimensional CNN may be applied or $x_m$ may be regarded as an image of Q channel with a size of $1 \times N_m$ so that 1 dimensional CNN may be applied. The Long Short-Term Memory (LSTM) may also be used as subspecies of the gated CNN or RNN in which each layer of the CNN is a Gated Linear Unit (GLU). The gated CNN was originally first introduced as a predictive model of word strings. It is reported that the gated CNN exerted higher word prediction performance than the LSTM in the experiments under the same condition. If hi is given as the output of the lth layer of the encoder, hi is represented in the gated CNN as

[Formula 11]

$$h_l = (w_l * h_{l-1} + b_l) \odot \sigma(v_l * h_{l-1} + c_l). \quad (11)$$

Note, however, that, $\sigma$ represents a sigmoid function for each element, and if $K_l$ is given as the number of channels in the lth layer and $Q^w_l \times N^w_l$ and $Q^v_l \times N^v_l$ are given as the filter sizes in the linear unit and gate unit of the lth layer, the parameter to be estimated is as follows.

$$w_l \in \mathbb{R}^{K_l \times K_{l-1} \times Q^w_l \times N^w_l}, b_l \in \mathbb{R}^{K_l},$$
$$v_l \in \mathbb{R}^{K_l \times K_{l-1} \times Q^v_l \times N^v_l}, c_l \in \mathbb{R}^{K_l}$$

This can be represented for each element as follows.

[Formula 12]

$$h_{l,k,q,u} = \left(\sum_{k'}\sum_{q',n'} w_{l,k,k',q-q',n-n'} h_{l-1,k',q',n'} + b_{l,k}\right) \cdot \qquad (12)$$
$$\sigma\left(\sum_{k'}\sum_{q',n'} v_{l,k,k',q-q',n-n'} h_{l-1,k',q',n'} + c_{l,k}\right)$$

The same holds for the decoder and the parameter of the decoder can be given as follows.

$w'_l \in \mathbb{R}^{K_l \times K_{l-1} \times Q^{W_l}/33 \cdot N^{W_l}}, \ b'_l \in \mathbb{R}^{K_l},$
$v'_l \in \mathbb{R}^{K_l \times K_{l-1} \times Q^{W_l} \times N^{W_l}}, \ c'_l \in \mathbb{R}^{K_l}$ For the output layer (the Lth layer) of the encoder and decoder, the following linear layers can be used, for example.

[Formula 13]

$$\mu_{\varphi\varphi}(x_m) = w_L * h_{L-1} + b_L \qquad (13)$$

[Formula 14]

$$\log \sigma_\varphi^2(x_m) = v_L * h_{L-1} c_L \qquad (14)$$

[Formula 15]

$$\mu_\theta(z_m) = w'_L * h'_{L-1} + b'_L \qquad (15)$$

[Formula 16]

$$\log \sigma_\theta^2(z_m) = v'_L * h'_{L-1} c'_L \qquad (16)$$

<InfomaxCVAE Voice Conversion (Method according to an Embodiment of the Present Invention)>
<Learning Method I>

In the conventional CVAE, with the encoder and decoder receiving the attribution code c as an auxiliary input, it is possible to learn the conditional distribution of the latent variable series $q_\phi(z|x, c)$ and the conditional distribution of the sound feature value series.

$p_\theta(x|z, c)$

However, with only the conventional learning criterion, the following may be learned to be independent of the attribution code c, depending on the complexity and expressiveness of the encoder and decoder as a function.

$q_\phi(z|x, c), p_\theta(x|z, c)$

For example, it may be easy to understand the case where the conversion process of the input x by the encoder and decoder is the identity mapping. Then, the model may be expressed without depending on any input x or auxiliary input c, so that $q_\phi(z|x, c), p_\theta(x|z, c)$ does not depend on the attribution code c as follows.

$q_\phi(z|x, c) = q_\phi(z|x), p_\theta(x|z, c) = p_\theta(x|z)$

Even when the thus learned model is input with the sound feature series with c set as the target attribution, the input value is directly output from the decoder without receiving any effect of c, which provides no conversion effect. To avoid the above situation, the embodiment of the present invention proposes a learning method that considers mutual information between the attribution code c and decoder output so that the attribution code c may affect the decoder output as much as possible. This method is referred to as the Information Maximizing CVAE (InfomaxCVAE).

The method according to the embodiment of the present invention considers the conventional learning criterion of the CVAE of formula (1) as well as learning of the encoder and decoder to provide as much mutual information as possible between the decoder output x and attribution c

[Formula 17]

$$\begin{aligned} I(c; x) &= \sum_c \int p(c, x) \log \frac{p(c, x)}{p(c)p(x)} dx \qquad (17) \\ &= \sum_c \int p(c, x) \log p(c \mid x) dx - \\ &\quad \sum_c \int p(c)p(x \mid c) \log p(c) dx \\ &= \sum_c \int p(c, x) \log p(c \mid x) dx - \\ &\quad \underbrace{\sum_c p(c) \log p(c)}_{H(c)} \\ &= \mathbb{E}_{c \sim p(c), x \sim p_\theta(x|z,c), c' \sim p(c|x)}[\log p(c', x)] + H(c) \end{aligned}$$

for input of the latent variable z and attribution code c. Here, H(c) represents the entropy of c and is a constant independent of the parameters of the encoder NN and decoder NN. As shown in formula (17), the mutual information I(c; x) can be written in a form including the posterior distribution of c.

$p(c|x)$

However, it is hard to describe the distribution analytically, so that it is also difficult to learn the encoder and decoder to increase formula (17) directly. Then, an auxiliary distribution $r(c|x)$ is introduced and the distribution $r(c|x)$ is used to give the lower bound of I(c; x) as follows.

[Formula 18]

$$\begin{aligned} I(c; x) &= \mathbb{E}_{c \sim p(c), x \sim p_\theta(x|z,c), c' \sim p(c|x)}[\log p(c', x)] + H(c) \qquad (18) \\ &= \mathbb{E}_{c \sim p(c), x \sim p_\theta(x|z,c), c' \sim p(c|x)}\left[\log \frac{r(c' \mid x) p(c' \mid x)}{r(c' \mid x)}\right] + H(c) \\ &= \mathbb{E}_{c \sim p(c), x \sim p_\theta(x|z,c)} \underbrace{\mathbb{E}_{c' \sim p(c|x)}\left[\log \frac{p(c' \mid x)}{r(c' \mid x)}\right]}_{KL[p(c|x)\|r(c|x)] \geq 0} + \\ &\quad \mathbb{E}_{c \sim p(c), x \sim p_\theta(x|z,c), c' \sim p(c|x)}[\log r(c' \mid x)] + H(c) \\ &\geq \mathbb{E}_{c \sim p(c), x \sim p_\theta(x|z,c), c' \sim p(c|x)}[\log r(c' \mid x)] + H(c) \\ &= \mathbb{E}_{c \sim p(c), x \sim p_\theta(x|z,c)}[\log r(c \mid x)] + H(c) \end{aligned}$$

The equal sign in the inequality holds when $r(c|x) = p(c|x)$

Therefore, $r(c|x)$ is considered as a variable, and increasing the right side with respect to $$r(c|x)$$

corresponds to approximation of p(c|x) with r(c|x) and approximation of I(c; x) with the right side. Therefore, by increasing the right side of formula (18) with respect to the auxiliary distribution $$r(c|x)$$

along with the encoder and decoder, one can increase the mutual information I(c; x) indirectly. The auxiliary distribution $$r(c|x)$$

may be regarded as an attribution identifier that represents the similarity of x to the attribution c. In the present method, $$r(c|x)$$

is expressed with the NN and its parameter $\psi$ is learned along with the parameters $\varphi$ and $\theta$ of the encoder NN and decoder NN. The auxiliary distribution represented with the NN of the parameter $\psi$ $$r(c|x)$$

is hereafter represented as $$r_\psi(c|x)$$

Because formula (17) represents the conditional mutual information between the decoder input/output for a given latent variable z generated from the encoder, the criterion to be maximized is the expectation of the right side of formula (18)

[Formula 19]

$$\mathcal{L}(\phi, \theta, \psi) = \mathbb{E}_{\tilde{c} \sim p(\tilde{c}),\, \tilde{x} \sim p(\tilde{x}|\tilde{c}) z \sim q(z|\tilde{x},\, \tilde{c})} \mathbb{E}_{c \sim p(c),\, x \sim p_\theta(x|z,c)} [\log r_{99}(c|x)]] \quad (19)$$

with respect to the encoder inputs $$\tilde{x}, \tilde{c}$$

and the encoder output z.

The criterion takes a large value when x generated from the decoder is correctly identified as having the attribution c by the identifier r, x being generated from the decoder when the decoder is input with a latent variable z and a randomly selected attribution c, and the latent variable z being generated from the encoder when the encoder is input with each sample of learning data $$\{\tilde{x}_m, \tilde{c}_m\}_{m=1}^M.$$

Therefore, learning each parameter to increase the criterion may provide a model that largely reflects the effect of the auxiliary input c in the decoding process. Note that the equality in the last line of formula (18) is represented by the following equality.

[Formula 20]

$$\begin{aligned}
\mathbb{E}_{x \sim p(x), y \sim p(y|x)}[f(x, y)] &= \int_x p(x) \int_y p(y|x) f(x, y) dy dx \\
&= \int_x \int_y p(x, y) f(x, y) dy dx \\
&= \int_x \int_y p(x, y) f(x, y) \int_{x'} p(x'|y) dx' dy dx \\
&= \int_x \int_y p(x|y) p(y) f(x, y) \int_{x'} p(x'|y) dx' dy dx \\
&= \int_x \int_y p(x|y) f(x, y) \int_{x'} p(x', y) dx' dy dx \\
&= \int_{x'} \int_y p(x'|y) f(x', y) \int_x p(x, y) dx dy dx' \\
&= \int_{x'} \int_y p(x'|y) f(x', y) \int_x p(x) p(y|x) dx dy dx' \\
&= \int_x p(x) \int_y p(y|x) \int_{x'} p(x'|y) f(x'|y) dx' dy dx \\
&= \mathbb{E}_{x \sim p(x), y \sim p(y|x), x' \sim p(x|\tilde{y})}[f(x', y)]
\end{aligned} \quad (20)$$

Thus, the learning criterion of the InfomaxCVAE is as follows.

[Formula 21]

$$\mathcal{J}(\phi, \theta) + \mathcal{L}(\phi, \theta, \psi) \quad (21)$$

The encoder, decoder, and attribution identifier may be learned using this criterion by iteratively updating the respective NN parameters $\varphi$, $\theta$, and $\psi$ by the Backpropagation.

<Learning Method II>

The attribution identifier $$r_\psi(c|x)$$

may also be learned directly from learning data provided with the attribution code, $$\{\tilde{x}_m \tilde{c}_m\}_{m=1}^M.$$

Therefore, the learning criterion may include, for example, an identification score

[Formula 22]

$$\mathcal{I}(\psi) = \mathbb{E}_{\tilde{c} \sim p(\tilde{c}), \tilde{x} \sim p(\tilde{x}|\tilde{c})}[\log r_\Phi(\tilde{c} | \tilde{x})] \quad (22)$$

for $$\{\tilde{x}_m \tilde{c}_m\}_{m=1}^M$$

Therefore, the learning criterion of the InfomaxCVAE in this case is as follows.

[Formula 23]

$$\mathcal{J}(\phi, \theta) + \mathcal{L}(\phi, \theta, \psi) + \mathcal{I}(\psi) \quad (23)$$

Like the learning method I, the encoder, decoder, and attribution identifier may be learned by iteratively updating the respective NN parameters $\varphi$, $\theta$, and $\psi$ by the Backpropagation.

Alternatively, the identifier $$r_{104}(c|x)$$

may be learned only with the criterion of $$\mathcal{I}(\psi)$$

Then, for φ and θ, the identifier is learned to increase $$\mathcal{J}_{(\varphi, \theta)} + \mathcal{L}_{(\varphi, \theta, \psi)}$$

and for ψ, the identifier is learned to increase $$\mathcal{I}_{(\psi)}$$

<About Attribution Code and Attribution Identifier>

It is assumed here that the attribution has I categories and each category has a plurality of classes. Therefore, the attribution c is expressed with I class labels. For example, c may be represented with a binary vector generated by coupling one-hot vectors (each vector including one element of 1 and all the other elements of 0),

[Formula 24]

$$c = [c_1, \ldots, c_I] \qquad (24)$$

[Formula ≅]

$$c_i = [c_{i,1}, \ldots, c_{i,J}] \qquad (25)$$

where each one-hot vector expresses the corresponding class in each category. If, for example, i is a "speaker" category, then j=1, . . . , J represents a speaker ID and if i is a "gender" category, then j=1, 2 represents male/female.

The attribution identifier $$r_{104}(c|x)$$

is a function like $$r_{104}(c|x): \mathbb{R}^{Q \times N} \rightarrow [0, 1]^{Q' \times N' \times I \times J}$$

and is regarded as a function that outputs probability representing the similarity of x to the class j in the category i in each patch (q', n'), if the sound feature value series $$x \in \mathbb{R}^{Q \times N}$$

is regarded as an image. For Q'=1, one probability in each class is allocated for each time n', and for N'=1, one probability in each class is allocated for entire sound feature value series x.

<Configuration of NN>

A voice has different ways of speaking and voice changing depending on the context and utterance content. Therefore, it is preferable that a function for converting the sound feature value has time dependence (i.e., the function is determined depending on the historical record of the sound feature value series of the input and output voices). Then, the embodiment of the present invention models the respective NNs of the encoder, decoder, and attribution identifier with the RNN such as the Long Short-Term Memory (LSTM) and Birectional LSTM (BiLSTM), CNN including convolution in time direction, the gated CNN, or the like to perform conversion and identification that may reflect the time dependence of the sound feature value of the voice.

<Conversion Method (Method according to an Embodiment of the Present Invention)>

The sound feature vector includes, (A1) a vector having a logarithmic amplitude spectrum as an element,
(A2) a vector having a mel-cepstrum coefficient as an element,
(A3) a vector having a linear predictive coefficient as an element,
(A4) a vector having a Partial Correlation (PARCOR) coefficient as an element, and
(A5) a vector having a Line Spectral Pair (LSP) parameter as an element.

(A1) may be obtained by time-frequency analysis such as the STFT and wavelet transform, (A2) by the mel-cepstrum analysis, (A3) by the linear predictive analysis, (A4) by the PARCOR analysis, and (A5) by the LSP analysis. In addition, (A1) may be a spectrum envelope obtained by the STRAIGHT analysis, the WORLD analysis or the like, and (A2-A5) may be obtained from the spectrum envelope by applying the respective analyses thereto. For example, the following (B1-B5) may be used as the sound feature vector.

(B1) A vector having a log-spectrum envelope as an element,
(B2) a vector having a mel-cepstrum coefficient from B1 as an element,
(B3) a vector having a linear predictive coefficient from B1 as an element,
(B4) a vector having a PARCOR coefficient from B1 as an element, and
(B5) a vector having an LSP parameter from B1 as an element.

After the learning of φ and θ is completed, the attribution code c and sound feature value series x of the input voice are may be input to the encoder and the output of the encoder and the target attribution code c' are input to the decoder, thus providing the sound feature value series ˆx of the converted voice. This process may be expressed as

[Formula 26]

$$\hat{x} = \mu_{74}(\mu_\phi(x, c), c') \qquad (26)$$

The time domain signal may be obtained from the resulting ˆx to provide the converted voice. This may be achieved by using inverse transform of the time-frequency analysis (such as the inverse STFT and wavelet inverse transform) for (A1) used as the sound feature value or by using a vocoder for (A2)-(A5), (B1)-(B5) used.

Because x from the above method tends to be excessively smoothed, the following method may also be used.

First, a reconfiguration sound feature value series of the input voice is obtained from the following formula.

[Formula 27]

$$\tilde{x} = \mu_\theta(\mu_{99}(x, c), c) \qquad (27)$$

The ˜X thus obtained may also be excessively smoothed. Using this fact, a spectrum gain series may be calculated from the ˆX and ˜X, and then may be multiplied to the spectrum series or spectrum envelope series of the input voice for each frame, thus obtaining the spectrum series or spectrum envelope series of the converted voice. In addition, the spectrum gain of each frame may be converted to the time domain to obtain an impulse response and then the impulse response may be convoluted to the time domain signal of the input voice for each frame, thus directly obtaining the time domain signal of the converted voice.

<Configuration of Voice Conversion Learning System according to an Embodiment of the Present Invention>

A description will now be given of the configuration of the voice conversion learning system according to an embodiment of the present invention. As shown in FIG. 1, the voice conversion learning system 100 according to the embodiment of the present invention may be configured by a computer including a CPU, a RAM, and a ROM that stores a program and various data for performing a voice conversion learning process routine described below. The voice conversion learning system 100 includes, from a functional point of view, an input unit 10, an operation unit 20, and an output unit 50, as shown in FIG. 1.

The input unit 10 receives, parallel data of a conversion-source voice signal and a latent variable series in the conversion-source voice signal, and an attribution code indicating attribution of the conversion-source voice signal. Note that the attribution code indicating the attribution of the conversion-source voice signal may be provided manually. In addition, the attribution of the voice signal includes, for example, gender, adults/children, speaker ID, whether native speaker or not (national origin), the type of utterance mood (such as anger and sadness), and utterance mode (such as lecture-like and free utterance-like).

The operation unit 20 is configured by including a sound feature extraction unit 30 and a learning unit 32.

The sound feature extraction unit 30 extracts the sound feature value series from the input conversion-source voice signal.

The learning unit 32 learns an encoder for, on the basis of parallel data of a sound feature value series in a conversion-source voice signal and a latent variable series in the conversion-source voice signal, and an attribution code indicating attribution of the conversion-source voice signal, estimating a latent variable series from input of a sound feature value series and an attribution code, and a decoder for reconfiguring the sound feature value series from input of the latent variable series and the attribution code.

Specifically, the learning unit 32 is input with an error between the sound feature value series reconfigured by the decoder and the sound feature value series in the conversion-source voice signal in the parallel data, a distance between the latent variable series estimated by the encoder and the latent variable series in the conversion-source voice signal in the parallel data, and any attribution code. Additionally, the learning unit 32 learns the encoder, decoder, and attribution identifier to maximize a value of an objective function of formula (21), the objective function being represented using attribution code similarity of the sound feature value series reconfigured by the decoder, the attribution code similarity being similarity to the any attribution code identified by an attribution identifier. The learning unit 32 then outputs the results to the output unit 50. Here, the encoder, decoder, and attribution identifier are configured using the convolutional network or recurrent network.

For example, the encoder, decoder, and attribution identifier are configured using the gated CNN and the output hi of each convolution layer is represented with formula (11).

Note that the objective function may be represented further using attribution code similarity of the sound feature value series in the conversion-source voice signal, the attribution code similarity indicating the attribution of the conversion-source voice signal and being identified by the attribution identifier, as shown in formula (23).

In addition, the encoder and decoder may be learned to maximize a value of the objective function of formula (21) and the attribution identifier may be learned to maximize a value of formula (22).

<Configuration of Voice Conversion System according to an Embodiment of the Present Invention>

Figure 2:
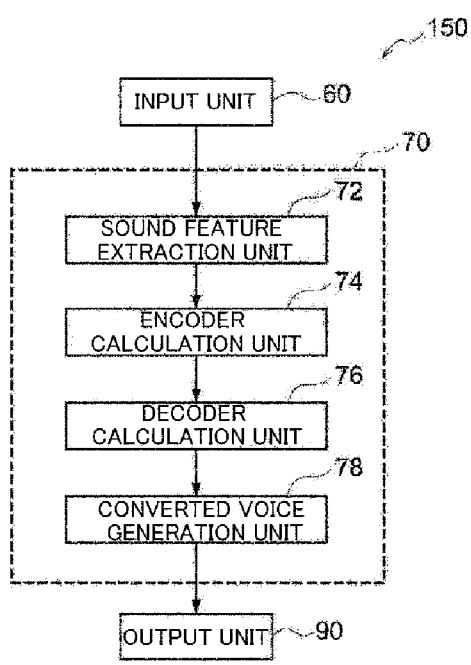
FIG. 2 is a block diagram showing a configuration of a voice conversion system according to an embodiment of the present invention.

A description will now be given of a configuration of a voice conversion system according to an embodiment of the present invention. As shown in FIG. 2, a voice conversion system 150 according to the embodiment of the present invention may be configured by a computer including a CPU, a RAM, and a ROM that stores a program and various data for performing a voice conversion process routine described below. The voice conversion system 150 includes, from a functional point of view, an output unit 90, an operation unit 70, and an input unit 60, as shown in FIG. 2.

The input unit 60 receives, as input, the conversion-source voice signal, the attribution code indicating the attribution of the conversion-source voice signal, and an attribution code indicating attribution of a target voice signal. Note that the attribution code indicating the attribution of the conversion-source voice signal and the attribution code indicating the attribution of the target voice signal may be provided manually. In addition, the attribution code indicating the attribution of the conversion-source voice signal may be extracted automatically from the conversion-source voice signal.

The operation unit 70 is configured by including a sound feature extraction unit 72, an encoder calculation unit 74, a decoder calculation unit 76, and a converted voice generation unit 78.

The sound feature extraction unit 72 extracts the sound feature value series from the input conversion-source voice signal.

The encoder calculation unit 74 estimates, using the encoder learned by the voice conversion learning system 100, the latent variable series from the sound feature amount series extracted by the sound feature extraction unit 72 and the attribution code received by the input unit 60.

The decoder calculation unit 76 estimates, using the decoder learned by the voice conversion learning system 100, the sound feature amount series of the target voice signal from the estimated latent variable series and the input attribution code indicating the attribution of the target voice signal according to above formula (26).

The converted voice generation unit 78 generates a time domain signal from the estimated sound feature value series of the target voice signal and outputs the time domain signal by the output unit 90 as the target voice signal.

Note that, the spectrum gain function with attribution conversion may be calculated on the basis of a variation between a sound feature value series converted from the sound feature value series of the input voice by the encoder and decoder to provide the target attribution according to formula (26) and a sound feature value series converted from the sound feature value series of the input voice by the encoder and decoder to provide the same attribution as the input voice according to the formula (27), and then the spectrum gain function may be multiplied to the spectrum series or spectrum envelope series of the input voice for each frame, thus obtaining the spectrum series or spectrum envelope series of the target voice signal and generating the time domain signal of the target voice signal.

<Operation of Voice Conversion Learning System according to an Embodiment of the Present Invention>

Figure 3:
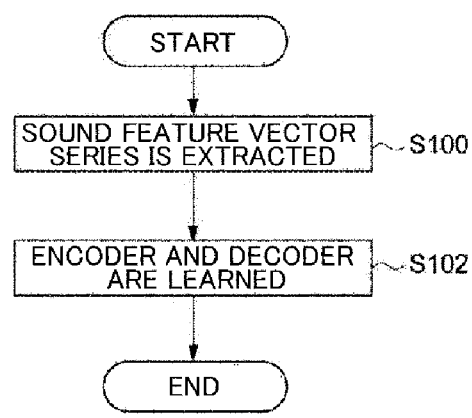
FIG. 3 is a flowchart showing a voice conversion learning process routine in a voice conversion learning system according to an embodiment of the present invention.

A description will now be given of an operation of a voice conversion learning system 100 according to an embodiment of the present invention. As the input unit 10 receives the parallel data of the conversion-source voice signal and the latent variable series in the conversion-source voice signal as well as the attribution code indicating the attribution of the conversion-source voice signal, the voice conversion learning system 100 performs the voice conversion learning process routine as shown in FIG. 3.

First, at step S100, the sound feature amount series is extracted from the input conversion-source voice signal.

Next, at step S102, on the basis of the parallel data of the sound feature value series in the conversion-source voice signal and the latent variable series in the conversion-source voice signal as well as the attribution code indicating the attribution of the conversion-source voice signal, the encoder, decoder, and attribution identifier are learned, and the learning results are output by the output unit 50. The voice conversion learning process routine is then ended.

<Operation of Voice Conversion System according to an Embodiment of the Present Invention>

Figure 4:
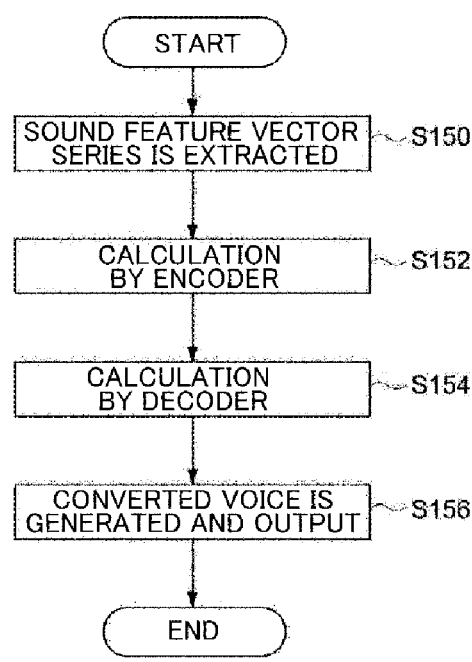
FIG. 4 is a flowchart showing a voice conversion process routine in a voice conversion system according to an embodiment of the present invention.

A description will now be given of an operation of the voice conversion system 150 according to an embodiment of the present invention. The input unit 60 receives the learning results by the voice conversion learning system 100. In addition, as the input unit 60 receives the conversion-source voice signal, the attribution code indicating the attribution of the conversion-source voice signal, and the attribution code indicating the attribution of the target voice signal, the voice conversion system 150 performs the voice conversion process routine as shown in FIG. 4.

First, at step S150, the sound feature amount series is extracted from the input conversion-source voice signal.

Next, at step S152, the latent variable series is estimated from the sound feature amount series extracted by the sound feature extraction unit 72 and the attribution code received by the input unit 60, using the encoder learned by the voice conversion learning system 100.

Next, at step S154, the sound feature amount series of the target voice signal is estimated from the estimated latent variable series and the input attribution code indicating the attribution of the target voice signal, using the decoder learned by the voice conversion learning system 00.

F0 in the voiced section is calculated from the learning data of the conversion-source voice. Then the log F0 pattern y(0), ..., y(N−1) of the input voice is converted as follows.

[Formula 28]

$$\tilde{y}(n) = \frac{\sigma_{trg}}{\sigma_{src}}(y(n) - m_{stc}) + m_{trg} \quad (28)$$

The network structure of the encoder, decoder, and attribution identifier in this experiment is as shown in table 1. In each table, the first column represents a type of each layer, the second column represents the number and size of channels input to each layer, the third column represents the number and size of channels output from each layer, the fourth column represents a filter size, the fifth column represents the stride of convolution, and the sixth column represents a type of the activation function (GLU abbreviates the Gated Linear Unit and BN abbreviates the Batch Normalization).

TABLE 1

| Encoder (Input: $(1+4)$ch × 36 × 512, Output: $(5 \times 2)$ch × 1 × 128) | | | | | |
|---|---|---|---|---|---|
| convolution, | in: $(1+4)$ch × 36 × 512, | out: 8ch × 36 × 512, | 3 × 9, | (1, 1), | GLU & BN |
| convolution, | in: $(8+4)$ch × 36 × 512, | out: 16ch × 18 × 256, | 4 × 8, | (2, 2), | GLU & BN |
| convolution, | in: $(16+4)$ch × 18 × 256, | out: 16ch × 9 × 128, | 4 × 8, | (2, 2), | GLU & BN |
| convolution, | in: $(16+4)$ch × 9 × 128, | out: $(5 \times 2)$ch × 1 × 128, | 9 × 5, | (9, 1), | GLU & BN |
| Decoder (Input: $(3+4)$ch × 1 × 128, Output: $(1 \times 2)$ch × 36 × 512) | | | | | |
| deconvolution, | in: $(5+4)$ch × 1 × 128, | out: 16ch × 9 × 128 | 9 × 5, | (9, 1), | GLU & BN |
| deconvolution, | in: $(16+4)$ch × 9 × 128, | out: 16ch × 18 × 256, | 4 × 8, | (2, 2), | GLU & BN |
| deconvolution, | in: $(16+4)$ch × 18 × 256, | out: 8ch × 36 × 512, | 4 × 8, | (2, 2), | GLU & BN |
| deconvolution, | in: $(8+4)$ch × 36 × 512, | out: $(1 \times 2)$ch × 36 × 512, | 3 × 9, | (1, 1), | None |
| Attribution identifier (Input: 1ch × 8 × 512, Output: 4ch × 1 × 16) | | | | | |
| convolution, | in: 1ch × 8 × 512, | out: 8ch × 4 × 256, | 4 × 4, | (2, 2), | GLU & BN |
| convolution, | in: 8ch × 4 × 256, | out: 16ch × 2 × 128, | 4 × 4, | (2, 2), | GLU & BN |
| convolution, | in: 16ch ×2 × 128, | out: 32ch × 1 × 64, | 4 × 4, | (2, 2), | GLU & BN |
| convolution, | in: 32ch × 1 × 64, | out: 16ch × 1 × 32, | 3 × 4, | (1, 2), | GLU & BN |
| convolution, | in: 16ch × 1 × 32, | out: 4ch × 1 × 16, | 1 × 4, | (1, 2), | Softmax |

At step S156, the time domain signal is generated from the estimated sound feature amount series of the target voice signal and is output by the output unit 90 as the target voice signal. The voice conversion process routine is then ended.

<Experimental Results>

To confirm the converted voice quality and the conversion effect according to the technique in the embodiment of the present invention, audio data of 4 speakers in Voice Conversion Challenge (VCC) 2018 (a female speaker VCC2SF1, a male speaker VCC2SM1, a female speaker VCC2SF2, and a male speaker VCC2SM2) were used to do a speaker individuality conversion experiment. Here, the attribution code was a 4 dimensional one-hot vector corresponding to the speaker ID. Each speaker has learning data of 81 sentences and test data of 35 sentences. The entire voice signal has a sampling frequency of 22050 Hz. From each utterance, the WORLD analysis extracts the spectrum envelope, basic frequency (F0), and non-periodicity index. The extracted spectrum envelope series is then subjected to 35th order mel-cepstral analysis. For F0, the average msrc and standard deviation $\sigma_{src}$ of log F0 in the voiced section is calculated from the learning data of the conversion-target voice and the average $m_{trg}$ and standard deviation $\sigma_{src}$ of log (+4) ch of the input to each layer of the encoder and decoder means the auxiliary input channel of the attribution code c. (×2) ch of the output from the encoder and decoder means a channel corresponding to the average and log dispersion of the gauss distribution.

Figure 5:
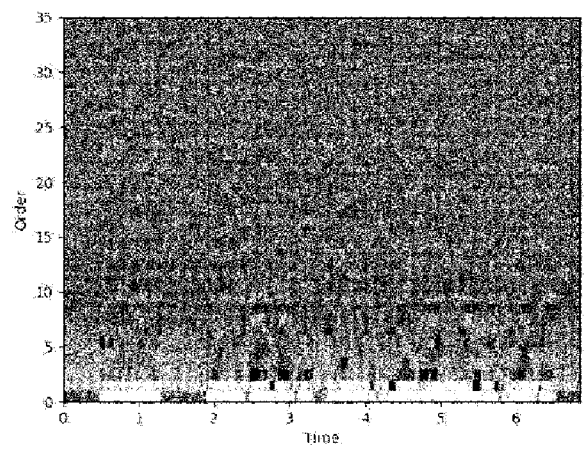
FIG. 5 shows a sound feature value series of a conversion-source voice (test data).
Figure 6:
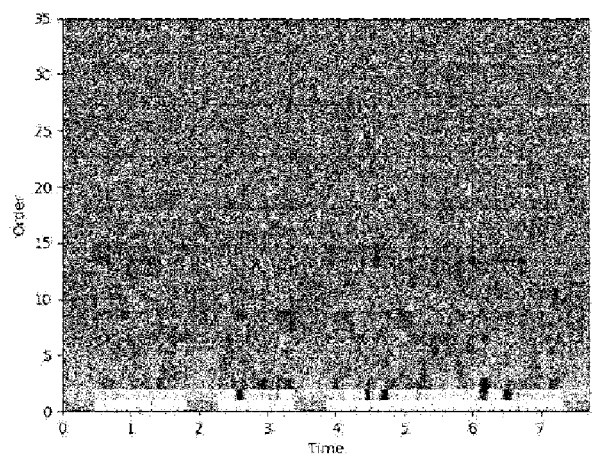
FIG. 6 shows a feature value series of a target voice having the same utterance sentence as the test data.
Figure 7:
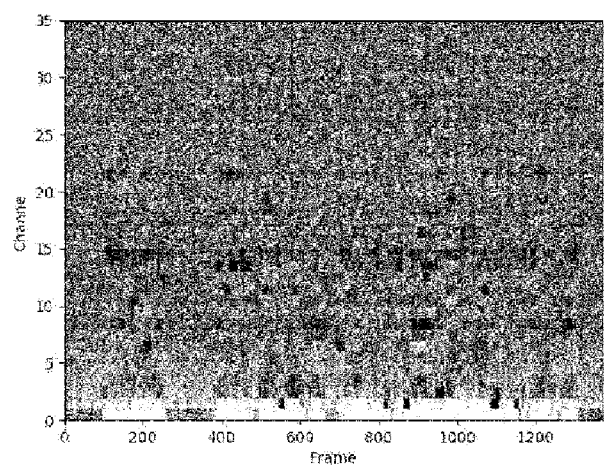
FIG. 7 shows a sound feature value series of a converted voice by a technique according to an embodiment of the present invention.
Figure 8:
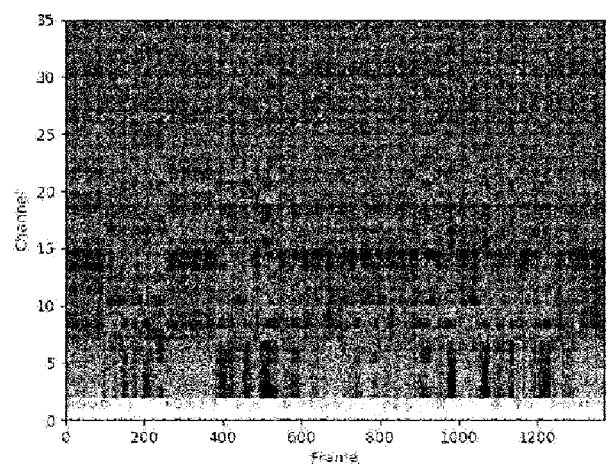
FIG. 8 shows a sound feature value series of the converted voice by a conventional technique.
Figure 9:
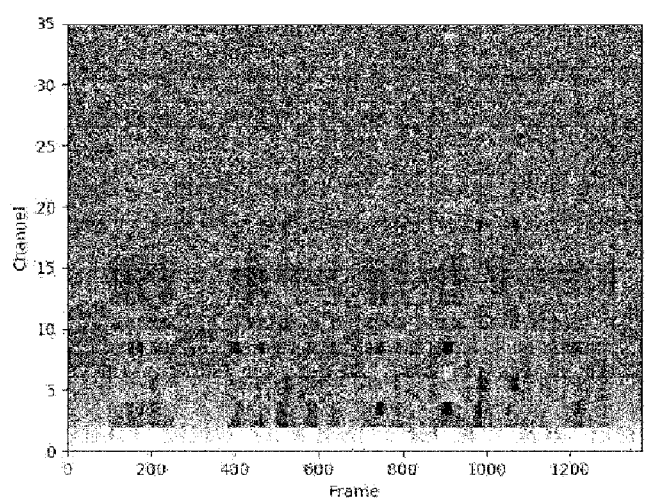
FIG. 9 shows a sound feature value series of the converted voice by another conventional technique.

For test data in FIG. 5, FIG. 7 shows the sound feature value series of the voice converted according to the method in the embodiment of the present invention, FIG. 8 shows the sound feature value series of the voice converted according to the conventional method (CVAE scheme) described in NPL 1, and FIG. 9 shows the sound feature value series of the voice converted according to the conventional method described in NPL 2, which is the improved version of the method of NPL 1. In addition, FIG. 6 shows the feature value series of the conversion-target voice that has the same utterance sentence as the test data. It was confirmed from FIGS. 7 to 9 that the method according to the embodiment of the present invention provided a converted voice of the sound feature value series that was nearer to that in FIG. 6 than the two conventional methods did. In addition, by listening to and comparing the voice signals generated from these sound feature value series, it was confirmed that the method according to the embodiment of the present invention provided a voice with higher quality and more similar to that of the conversion-target speaker than the conventional methods.

As described above, a voice conversion learning system according to an embodiment of the present invention may convert to a voice of a desired attribution by providing the following learning, from input of the following information, to an encoder for estimating a latent variable series from input of a sound feature value series and an attribution code and a decoder for reconfiguring a sound feature value series from input of a latent variable series and an attribution code. The information includes an error between the sound feature value series reconfigured by the decoder and the sound feature value series in the conversion-source voice signal in the parallel data, a distance between the latent variable series estimated by the encoder and the latent variable series in the conversion-source voice signal in the parallel data, and any attribution code. The learning is to maximize a value of an objective function, the objective function being represented using attribution code similarity of a sound feature value series reconfigured by the decoder from input of the above input value, the attribution code similarity being similarity to the any attribution code identified by an attribution identifier.

In addition, a voice conversion system according to an embodiment of the present invention may convert to a voice of a desired attribution by providing the following processing from input of the following information. The information includes an error between the sound feature value series reconfigured by the decoder and the sound feature value series in the conversion-source voice signal in the parallel data, a distance between the latent variable series estimated by the encoder and the latent variable series in the conversion-source voice signal in the parallel data, and any attribution code. The processing includes previously learning an encoder and a decoder to maximize a value of an objective function, the objective function being represented using attribution code similarity of a sound feature value series reconfigured by the decoder from input of the above input value, the attribution code similarity being similarity to the any attribution code identified by an attribution identifier. The above processing also includes using the encoder and decoder to estimate, by an encoder, a latent variable series from a sound feature value series in an input conversion-source voice signal and an attribution code indicating attribution of the conversion-source voice signal and estimating, by a decoder, a sound feature value series of a target voice signal from the estimated latent variable series and an attribution code indicating attribution of an input target voice signal.

Note that the present invention is not limited to the above embodiments and various modifications and application may be made without departing from the spirit of the present invention.

For example, although in the above embodiments, the voice conversion learning system and voice conversion system are configured as distinct systems, they may be configured as one system.

In addition, while the above voice conversion learning system and voice conversion system include a computer system therein, the "computer system" is defined to include a website providing environment (or a display environment) as long as it uses the WWW system.

In addition, although the specification of the present application describes embodiments in which a program is previously installed, the relevant program may be provided after being stored in a computer-readable storage medium.

REFERENCE SIGNS LIST 10 input unit
20 operation unit
30 sound feature extraction unit
32 learning unit
50 output unit
60 input unit
70 operation unit
72 sound feature extraction unit
74 encoder calculation unit
76 decoder calculation unit
78 converted voice generation unit
90 output unit
100 voice conversion learning system
150 voice conversion system

The invention claimed is:

1. A voice conversion learning system, the system comprises a processor configured to execute operations comprising:
  learning:
    encoding, on the basis of:
      parallel data of a sound feature value series in a conversion-source voice signal and a latent variable series in the conversion-source voice signal, and
      an attribution code indicating attribution of the conversion-source voice signal,
      estimating a latent variable series from input of the sound feature value series and the attribution code, and
    decoding comprising reconfiguring the sound feature value series from input of the latent variable series and the attribution code,
    wherein the learning further comprises learning the encoding and the decoding to maximize a value of an objective function,
    wherein the objective function being represented using:
      attribution code similarity of the sound feature value series reconfigured by the decoding from input of an error between the sound feature value series reconfigured by the decoding and the sound feature value series in the conversion-source voice signal in the parallel data,
      a distance between the latent variable series estimated by the encoding and the latent variable series in the conversion-source voice signal in the parallel data, and
      any attribution code, the attribution code similarity being similarity to the any attribution code identified by an attribution identifier.

2. The voice conversion learning system according to claim 1, wherein the objective function is represented further using attribution code similarity of a sound feature value series in the conversion-source voice signal, the attribution code similarity of the sound feature value series in the conversion-source voice signal indicating attribution of the conversion-source voice signal and being identified by the attribution identifier, and the learning further comprises learning the encoding, the decoding and the attribution identifier to maximize a value of the objective function.

3. The voice conversion learning system according to claim 1, wherein the learning further comprises learning the encoding and the decoding to maximize a value of the objective function as well as learns the attribution identifier on the basis of attribution code similarity of a sound feature value series in the conversion-source voice signal, the attribution code similarity indicating attribution of the conversion-source voice signal and being identified by the attribution identifier.

4. The voice conversion learning system according to claim 1, wherein each of the encoding, the decoding, and the attribution identifier is configured using a convolutional network or a recurrent network.

5. A voice conversion system, the system comprising a processor configured to execute operations comprising:
   encoding comprising estimating a latent variable series from input sound feature value series in a conversion-source voice signal and an attribution code indicating attribution of the conversion-source voice signal, the encoding further comprises estimating a latent variable series from input of a sound feature value series and an attribution code; and
   decoding comprising reconfiguring the sound feature value series from input of the latent variable series and the attribution code, the encoding and the decoding being previously learned to maximize a value of an objective function, on the basis of:
      parallel data of a sound feature value series in a conversion-source voice signal and a latent variable series in the conversion-source voice signal, and
      an attribution code indicating attribution of the conversion-source voice signal,
      wherein the objective function being represented using:
         attribution code similarity of a sound feature value series reconfigured by the decoding from input of an error between the sound feature value series reconfigured by the decoding and the sound feature value series in the conversion-source voice signal in the parallel data,
         a distance between the latent variable series estimated by the encoding and the latent variable series in the conversion-source voice signal in the parallel data, and
         any attribution code, the attribution code similarity being similarity to the any attribution code identified by an attribution identifier.

6. A voice conversion method, the method comprising:
   learning:
      encoding, on the basis of:
         parallel data of a sound feature value series in a conversion-source voice signal and a latent variable series in the conversion-source voice signal, and
         an attribution code indicating attribution of the conversion-source voice signal, estimating a latent variable series from input of the sound feature value series and an attribution code, and
      decoding further comprising reconfiguring the sound feature value series from input of the latent variable series and the attribution code,
      wherein the learning includes the encoding and decoding to maximize a value of an objective function,
      wherein the objective function being represented using:
         attribution code similarity of the sound feature value series reconfigured by the decoding from input of an error between the sound feature value series reconfigured by the decoding and the sound feature value series in the conversion-source voice signal in the parallel data,
         a distance between the latent variable series estimated by the encoding and the latent variable series in the conversion-source voice signal in the parallel data, and
         any attribution code, the attribution code similarity being similarity to the any attribution code identified by an attribution identifier.

7. The voice conversion method of claim 6, the method further comprising:
   estimating a latent variable series from input sound feature value series in a conversion-source voice signal and an attribution code indicating attribution of the conversion-source voice signal, wherein the estimating estimates the latent variable series from input of a sound feature value series and an attribution code; and
   estimating, by the decoding, a sound feature value series of a target voice signal from the estimated latent variable series and the input attribution code indicating attribution of the target voice signal by using a decoding for reconfiguring the sound feature value series from input of the latent variable series and the attribution code, the encoding and decoding being previously learned to maximize a value of an objective function, on the basis of:
      parallel data of a sound feature value series in a conversion-source voice signal and a latent variable series in the conversion-source voice signal, and
      an attribution code indicating attribution of the conversion-source voice signal, the objective function being represented using:
         attribution code similarity of a sound feature value series reconfigured by the decoding from input of an error between the sound feature value series reconfigured by the decoding and the sound feature value series in the conversion-source voice signal in the parallel data,
         a distance between the latent variable series estimated by the encoding and the latent variable series in the conversion-source voice signal in the parallel data, and
         any attribution code, the attribution code similarity being similarity to the any attribution code identified by an attribution identifier.

8. A computer-readable non-transitory recording medium storing a computer-executable program for a voice conversion learning system that when executed by a processor cause the computer-executable program to:
   learn:
      encoding, on the basis of:
         parallel data of a sound feature value series in a conversion-source voice signal and a latent variable series in the conversion-source voice signal, and
         an attribution code indicating attribution of the conversion-source voice signal,
         estimating a latent variable series from input of the sound feature value series and the attribution code, and
      decoding comprising reconfiguring the sound feature value series from input of the latent variable series and the attribution code,
      wherein the learning further comprises learning the encoding and the decoding to maximize a value of an objective function,
      wherein the objective function being represented using:

attribution code similarity of the sound feature value series reconfigured by the decoding from input of an error between the sound feature value series reconfigured by the decoding and the sound feature value series in the conversion-source voice signal in the parallel data, a distance between the latent variable series estimated by the encoding and the latent variable series in the conversion-source voice signal in the parallel data, and any attribution code, the attribution code similarity being similarity to the any attribution code identified by an attribution identifier.

9. The voice conversion learning system according to claim 2, wherein each of the encoding, the decoding, and the attribution identifier is configured using a convolutional network or a recurrent network.

10. The voice conversion learning system according to claim 3, wherein each of the encoding, the decoding, and the attribution identifier is configured using a convolutional network or a recurrent network.

11. The voice conversion method of claim 6, wherein the objective function is represented further using attribution code similarity of a sound feature value series in the conversion-source voice signal, the attribution code similarity of the sound feature value series in the conversion-source voice signal indicating attribution of the conversion-source voice signal and being identified by the attribution identifier, and the learning further comprises learning the encoding, the decoding, and the attribution identifier to maximize a value of the objective function.

12. The voice conversion method of claim 6, wherein the learning further comprises learning the encoding and the decoding to maximize a value of the objective function as well as learns the attribution identifier on the basis of attribution code similarity of a sound feature value series in the conversion-source voice signal, the attribution code similarity indicating attribution of the conversion-source voice signal and being identified by the attribution identifier.

13. The voice conversion method of claim 6, wherein each of the encoding, the decoding, and the attribution identifier is configured using a convolutional network or a recurrent network.

14. The voice conversion method of claim 11, wherein each of the encoding, the decoding, and the attribution identifier is configured using a convolutional network or a recurrent network.

15. The voice conversion method of claim 12, wherein each of the encoding, the decoding, and the attribution identifier is configured using a convolutional network or a recurrent network.

16. The computer-readable non-transitory recording medium of claim 8, wherein the objective function is represented further using attribution code similarity of a sound feature value series in the conversion-source voice signal, the attribution code similarity of the sound feature value series in the conversion-source voice signal indicating attribution of the conversion-source voice signal and being identified by the attribution identifier, and the learning further comprises learning the encoding, the decoding, and the attribution identifier to maximize a value of the objective function.

17. The computer-readable non-transitory recording medium of claim 8, wherein the learning further comprises learning the encoding and the decoding to maximize a value of the objective function as well as learns the attribution identifier on the basis of attribution code similarity of a sound feature value series in the conversion-source voice signal, the attribution code similarity indicating attribution of the conversion-source voice signal and being identified by the attribution identifier.

18. The computer-readable non-transitory recording medium of claim 8, wherein each of the encoding, the decoding, and the attribution identifier is configured using a convolutional network or a recurrent network.

19. The computer-readable non-transitory recording medium of claim 16, wherein each of the encoding, the decoding, and the attribution identifier is configured using a convolutional network or a recurrent network.

20. The computer-readable non-transitory recording medium of claim 17, wherein each of the encoding, the decoding, and the attribution identifier is configured using a convolutional network or a recurrent network.

* * * * *